United States Patent Office 3,078,361
Patented Feb. 19, 1963

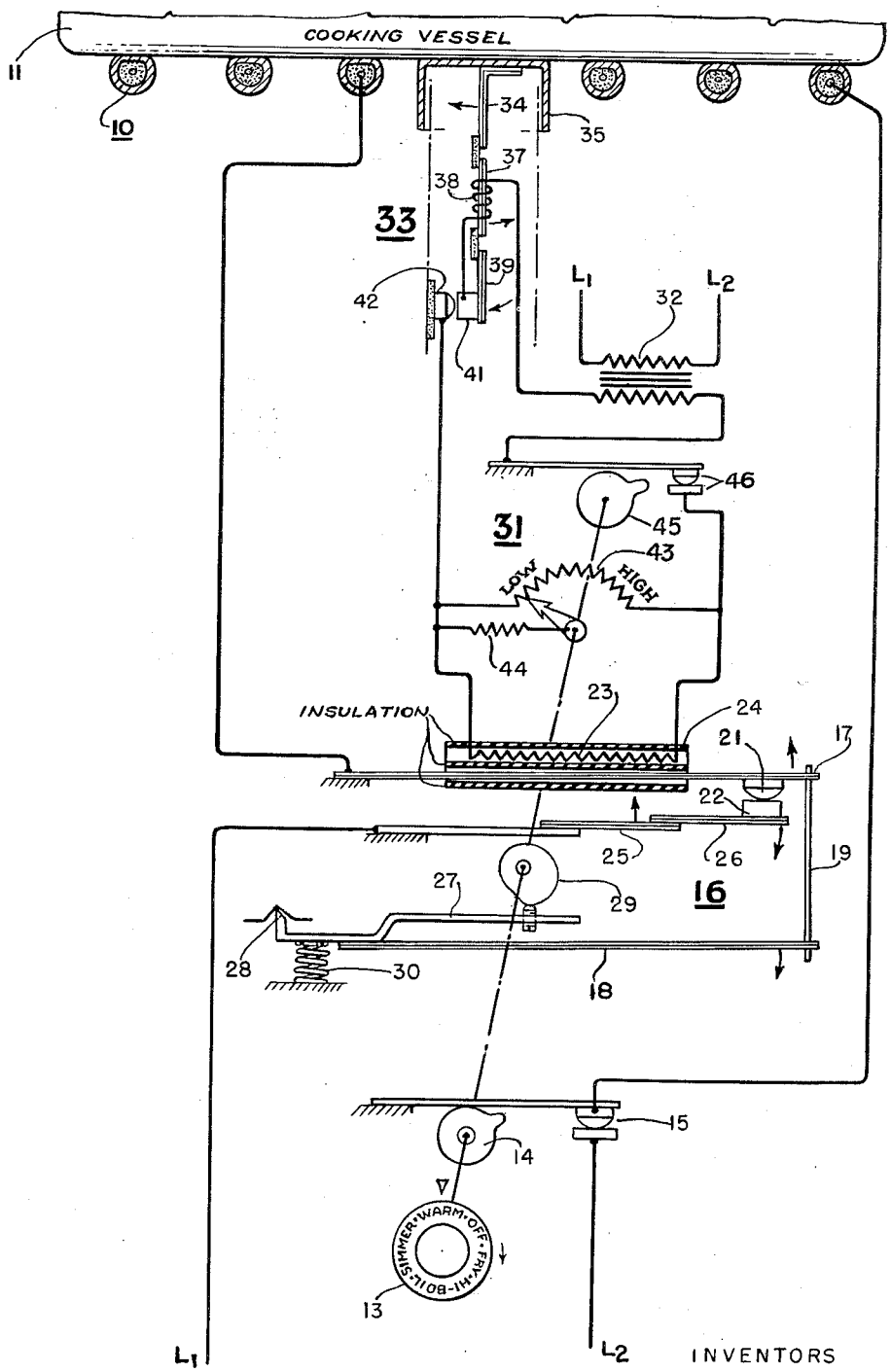

3,078,361
TEMPERATURE RESPONSIVE CONTROL
Stuart A. Mason, Shelton, and Vincent G. Krenke, Fairfield, Conn., assignors to Westinghouse Electric Corporation, East Pittsburgh, Pa., a corporation of Pennsylvania
Filed Jan. 15, 1960, Ser. No. 2,617
7 Claims. (Cl. 219—20)

This invention relates to a temperature responsive control, more particularly a control that regulates an electric heating unit to maintain a body or substance heated thereby at a substantially constant temperature. The control is particularly suited for the surface heating unit of an electric range.

An object of the invention is to provide an improved control of the character set forth.

A further object is to provide a control of relatively simple and inexpensive construction.

Another object is to provide a control giving improved performance.

In accordance with the present invention, there is provided a first or main cycling switch that turns the current on and off and, by controlling the percentage of time that the current is on, controls the average wattage delivered to the heating unit being controlled. The main cycling switch is controlled by a control circuit that includes a second or sensor cycling switch, the percentage of "on" time of which is varied in response to the temperature of the body or substance being heated, and it further includes a control heating element, the heat output of which is varied by said sensor cycling switch. The main cycling switch includes temperature responsive means subjected to the heat of the control heating element and operates in response to variations in such heat to vary its "on" period or regulating action. Preferably, the sensor cycling switch increases the heat output of the control heating element upon increase in temperature of the body or substance to be heated, and the main cycling switch operates in response to such increase in heat to decrease the average wattage to the heating unit being controlled. The frequency of cycling of the sensor cycling switch is several times the frequency of cycling of the main cycling switch, in order to provide substantially constant value of the heat output of the control heating element, which value determines the percentage of "on" time of the main cycling switch.

Preferably, also, the control circuit includes a variable resistor for varying the instantaneous wattage delivered to the control heating element during the time that it is energized, thereby to vary the temperature setting of the control. The main cycling switch is preferably provided with a manual adjustment, operated by the same manual control element that operates the variable resistor, for varying the relation of wattage output to the heat of the control heating element, in order to provide the desired amount of change in temperature setting for a given movement of the manual control element throughout different portions of its range of movement.

The above and other objects are effected by the invention as will be apparent from the following description and claims taken in connection with the accompanying drawing, forming a part of this application, in which:

The single FIGURE is a schematic wiring diagram of a control incorporating the present invention.

Referring to the drawings in detail, the novel control is shown applied to a surface heating unit 10, which may be of the well known tubular sheathed heater type commonly used on electric ranges. A cooking vessel 11 rests on the unit 10 to be heated thereby. Electric current is supplied to the heating unit 10 from electrical supply conductors L1 and L2 under control of the novel temperature responsive control which will now be described.

The control includes a manually actuated knob 13 for concurrently rotating the manually adjusted elements of the control about a common axis indicated by the dot-and dash line. By means of the knob 13, the control is adjustable between an "off" position and a plurality of active or "on" positions providing different temperature settings. The control includes a cam 14 actuated by the knob 13 for opening line contacts 15 to disconnect the heating unit 10 from the line conductor L2 when the knob is adjusted to the "off" position, and to close these contacts in all other positions.

The control next includes a main cycling switch 16 connected between the other terminal of the heating unit 10 and the line conductor L1. This switch is of a type that cyclically opens and closes the circuit, and whose adjustment is infinitely variable, so that it is commonly referred to as an infinite switch. The switch 16 shown is essentially the switch disclosed and claimed in Patent No. 2,870,290 of O. L. Taylor and C. M. Smith.

The cycling switch 16 comprises two bimetal arms 17 and 18 mounted at their left-hand ends and extending in parallel relation, and so as to tend to move away from each other upon increase in temperature. A link 19 connects the movable ends of the bimetal arms and is held in tension by the tendency of the bimetals to move away from each other. The bimetal arm 17, which may be considered as the primary bimetal of the two, carries a movable contact 21 cooperating with a relatively stationary contact 22. The contact 22 is mounted on a contact carrying arm which may comprise bimetals 25 and 26. The bimetal 25 is movable upon increase in temperature in contact closing direction, and it serves, upon passage of current therethrough, to move the contact 22 into more firm engagement with the contact 21 and, upon opening of the circuit, it cools and moves the contact 22 to further separate the contacts. The bimetal 26 serves to compensate for the effect of ambient temperature upon the bimetal 25. The passage of current has greater heating effect on bimetal 25 than on bimetal 26. The bimetal arm 17 carries the line current to the heating unit 10 and is made of materials that offer some resistance to flow of electric current, so that the bimetal is heated upon passage of current when the contacts 21 and 22 are closed.

The wattage provided by the cycling switch 16 is varied principally by the variable heat provided by a control heating element 23, whose heat is imposed on a temperature responsive means incorporated in the cycling switch. In the present embodiment it is imposed upon the bimetal arm 17. The element 23 is disposed on one or both sides of the arm 17 in heat transfer relation thereto, and electrical and heat insulation 24 is provided between the arm 17 and the element 23 to control the rate of heat flow from the element to the arm and also from both the element and the arm to the ambient atmosphere.

The bimetal arm 18 serves to variably bias the bimetal arm 17 to compensate for the effect of variations in ambient temperature and also to provide for manual wattage adjustment of the switch. It is mounted on a movable arm 27 which has a knife edge fulcrum 28 and which is manually adjusted by a cam 29 actuated by the knob 13. The arm 27 may have an adjustable set screw which contacts the cam 26. A spring 30 biases the arm 27 in counterclockwise direction into engagement with the cam 29.

The main cycling switch 16 operates in the usual manner of a cycling wattage control switch. Assuming some arbitrary value of heat supplied by the control heating element 23, the operation is as follows: When the contacts 21 and 22 are closed, electric current passes through a circuit including the bimetal arm 17. This circuit extends from line conductor L1 through bimetals 25 and 26, contacts 22 and 21, bimetal arm 17, heating unit 10 and contacts 15 to line conductor L2. The bimetal arm 17 is heated by the passage of current therethrough, and as it reaches a sufficiently high temperature, it deflects to disengage the contact 21 from the contact 22 to open the circuit. After a period of time sufficient for the bimetal arm 17 to cool, it deflects in closing direction to reengage the contacts 21 and 22 and reclose the circuit. There is thus provided a cycling action opening and closing the circuit which is continuously repeated. The ratio of the "on" time to the total of "on" and "off" time, that is, the percentage of "on" time, determines the average wattage delivered to the heating unit 10. The frequency of cycling is sufficient, such as one to six cycles per minute, so that the heat output of the heating unit 10 to the vessel is substantially constant within practical limits.

The percentage of "on" time or average wattage provided by the switch may be further varied by manual adjustment. Upon rotation of the cam 29 to move the arm 27 downwardly or away from the bimetal arm 17, the bimetal arm 18 is deflected and imposes an additional force on the bimetal 17 in contact closing direction. Thus, longer "on" periods are required to heat the bimetal arm 17 sufficiently to open the contacts against the increased force, thereby resulting in higher average wattage to the heating unit. According to the present invention, the cycling switch is preferably so constructed that, with no energization of the control heating element 23, the contacts 21 and 22 are in continuous engagement at all positions of the cam 29, thereby providing continuous energization or maximum wattage to the heating unit when the vessel is cold.

The heat output of the control heating element 23 is varied in response to the temperature of the vessel 11 by a control circuit 31, which preferably operates to increase the heat output of the control heating element 23 upon increase in temperature of the cooking vessel. The control circuit 31 may be energized at relatively low voltage, such as 24 volts, by a transformer 32. This circuit includes and is controlled by a sensor switch 33, which is a cycling switch that is responsive to the temperature of the vessel placed on the surface heating unit 10. The sensor cycling switch 33 includes a bimetal element 34 of inverted L-shape attached, as by welding, to the under surface of a metal element 35 which engages the bottom surface of the vessel and senses the temperature thereof. To the lower end of the bimetal 34 there is connected, by a heat and electrical insulating member, a bimetal element 37 having a heating element 38 wrapped therearound. To the lower end of the bimetal 37 there is connected, by means of another heat and electrical insulating element, a bimetal element 39 carrying a movable contact 41 cooperating with a stationary contact 42. The bimetals 34 and 39 deflect in contact closing direction upon increase in temperature, and the bimetal 37 deflects in contact opening direction upon increase in temperature, as indicated by the arrows. The heating element 38 is in series with the contacts 41 and 42. The sensor switch is in series with the heating element 23 and controls the same. Its action is as follows: When the vessel is cold or at room temperature, the bimetal element 34 maintains the contacts of the sensor switch in open position or in a low contact pressure condition. Upon increase in vessel temperature, the bimetal 34 deflects to move the contact 41 in closing direction or to a higher contact pressure condition. Closing of the contacts energizes both the heating element 38 and the control heating element 23. The energization of the heating element 38 causes the bimetal 37 to heat and then deflect in contact opening direction, whereupon the control circuit opens and the bimetal 37 begins to cool. During the cooling period, the bimetal 37 again deflects in contact closing direction. The contacts are thus cyclically opened and closed. As the vessel increases in temperature, the bimetal 34 deflects further in contact closing direction and a greater period of energization of the heating element 38 is required to heat the bimetal 37 sufficiently to reopen the contacts; thus, the percentage of "on" time gradually increases to increase the average wattage supplied to the control heating element 23.

In order to provide temperature adjustment of the control, there is provided a variable resistor 43 connected in the control circuit in a manner to vary the instantaneous wattage of the control heating element 23 during the time that the control circuit is closed. In the illustrated embodiment, the variable resistor 43 is connected in parallel with the heating element 23 and in series with the contacts 41 and 42 and the heating element 38. A fixed resistor 44 is connected between the movable arm and one terminal of the variable resistor.

A cam 45 actuated by the knob 13 opens contacts 46 to open the control circuit 31 when the knob is in the off position and closes the contacts 46 in all other positions of the knob 13.

*Operation*

In the "off" position of the knob, the high point of the cam 14 opens the contacts 15 to terminate all energization of the heating unit 10 and the high point of the cam 45 opens the contacts 46 to deenergize the control circuit 31, regardless of the temperature of the vessel.

Assume now that the vessel is cold and that it is desired to heat the same to a temperature suitable for warming, such as 150° F. The knob is turned to the position marked "warm," closing the contacts 15. The bimetal 34 of the sensor switch being cold, the contacts 41, 42 are open or closed at light pressure and the control heating element 23 is not heated or is cycled at low average heat. Accordingly, the main cycling switch 16 maintains its contacts continuously closed, and the heating unit 10 is energized continuously or at high heat.

As the temperature of the vessel approaches 150°, the bimetal 34 begins to close the contacts 41, 42 to begin cycling action of the control circuit or increases the contact closed time, as explained above, to begin or increase heating of the heating element 23. The latter begins to deliver sufficient heat to the bimetal 17 so that, together with the heat generated by the passage of current through the bimetal 17, the bimetal 17 deflects upwardly sufficiently to open the contacts 21, 22. The frequency of cycling of the control circuit is several times that of the main cycling switch 16, being, for example, thirty times a minute, so that the heat output of the heating element 23 is substantially constant. The cycling action of the switch 16 is produced then solely by the cycling action within the switch itself, that is, by the heat produced by the passage of current through the bimetal 17. Thus, as the vessel temperature increases, the heat of the element 23 increases and the "on" period of the switch 16 decreases, until an equilibrium point is reached at which the wattage to the heating element 10 balances the heat requirements to maintain the vessel at the desired temperature.

Assume now that the warming operation is completed and that it is desired to perform a frying operation. By turning the knob 13 in clockwise direction to the "fry" position, the control is adjusted to a higher temperature suitable for frying, such as 450° F. This is brought about as follows. The clockwise movement of the arm of the variable resistor 43 reduces the resistance therethrough, thereby reducing the drop in potential across the variable resistor 43 and the control element 23, to reduce the rate of heating of the latter. At the same time, the potential drop across the element 38 is increased to increase the rate of heating of the bimetal 37, which, in turn, reduces the "on" period, thereby still further reducing the heat output of the control heating element 23.

Due to the resulting reduced heat output of the element 23, the bimetal 17 moves in contact closing direction and a longer "on" period is now required to heat the bimetal 17 sufficiently to open the contacts 21, 22. Accordingly, the cycling switch 16 provides a higher percentage of "on" time and higher wattage, and the vessel is heated to a higher temperature. As the temperature of the vessel and the bimetal 34 increases, the percentage of "on" time of the switch 33 increases until it reaches the new temperature setting, at which time the higher percentage of "on" time produces sufficient heat within the heating element 23 to bring the cycling switch 16 within its regulating range. There is thus produced, at a higher temperature, equilibrium between the heat output of the vessel and the heat delivered to the vessel.

To perform a boiling operation, the control may be adjusted to provide the degree of boiling that may be desired, such as either a simmer or a high boil. Since the temperature of the vessel is substantially constant for all rates of boiling, the bimetal 34 maintains a substantially constant deflection. The wattage, then, is controlled by the control in accordance with the position of the variable resistor in the same manner as heretofore described. Upon movement of the variable resistor in clockwise direction, the heating effect of the control heating element 23 is reduced, causing the cycling switch 16 to provide increased wattage. There is no substantial resultant deflection of the bimetal 34 as in the previously mentioned temperature control operations.

The percentage of "on" time or wattage provided by the cycling switch for a given heat of the element 23 may also be varied by the cam 29. This is utilized in the present invention to modify the temperature adjusting action of the variable resistor 43 to obtain the desired amount change in setting for a given movement of the knob 13 throughout the different parts of its extent of movement. In the boiling range, for example, it may be desired to provide a smaller change in setting for a given movement of the knob, or, in other words, to increase the movement of the knob for a given change in setting. Accordingly, the cam 29 may be formed to gradually raise the arm 27, tending to lower the temperature setting, and thereby partially offsetting the increase in wattage effected by the variable resistor.

While the invention has been shown in but one form, it will be obvious to those skilled in the art that it is not so limited, but is susceptible of various changes and modifications without departing from the spirit thereof.

What is claimed is:

1. In a control for a surface heating unit or the like, the combination of a main cycling switch comprising a pair of contacts, temperature responsive means operable to move one of said contacts in opening direction upon increase in temperature and in closing direction upon decrease in temperature, and means for heating said temperature responsive means upon passage of electrical current through said contacts, whereby said contacts are cyclically opened and closed to control the percentage of "on" time of the circuit controlled thereby, said main cycling switch including temperature responsive means for adjusting the setting thereof; and a control circuit for said main cycling switch including a heating element arranged to heat said last-mentioned temperature responsive means and a second cycling switch controlling said heating element, the latter switch comprising a pair of contacts in series with said heating element, a temperature responsive element operable to move one of the contacts of said second cycling switch in opening direction upon increase in temperature and in closing direction upon decrease in temperature, said temperature responsive element being heated upon passage of current through said second cycling switch contacts, whereby said latter contacts are cyclically opened and closed to control the average wattage delivered to said heating element, and a second temperature responsive element operable to control the action of said second cyling switch to vary the percentage of "on" time thereof in response to variation in its temperature, the frequency of cycling of the second cycling switch being several times the frequency of cycling of the main cycling switch.

2. A control as set forth in claim 1 and further including a manually adjusted variable resistor connected in the control circuit in parallel with said heating element and in series with said second cycling switch.

3. In a control for a surface heating unit or the like, the combination of a main cycling switch comprising a pair of contacts, temperature responsive means operable to move one of said contacts in opening direction upon increase in temperature and in closing direction upon decrease in temperature, and means for heating said temperature responsive means upon passage of electrical current through said contacts, whereby said contacts are cyclically opened and closed to control the percentage of "on" time of the circuit controlled thereby, said main cycling switch including temperature responsive means for adjusting the setting thereof and operable to decrease and increase the percentage of "on" time thereof of said main cycling switch upon increase and decrease, respectively, in the temperature thereof; and a control circuit for said main cycling switch including a heating element arranged to heat said last-mentioned temperature responsive means and a second cycling switch controlling said heating element, the latter switch comprising a pair of contacts controlling said heating element, a temperature responsive element actuating one of the latter contacts upon increase in temperature to deenergize said heating element and upon decrease in temperature to energize said heating element, said temperature responsive element being heated under control of said latter contacts, whereby said heating element is cyclically energized and deenergized to control the average wattage delivered thereto, and a second temperature responsive element operable to control the action of said second cycling switch to vary the percentage of "on" time thereof in response to variation in its temperature, the frequency of cycling of the second cycling switch being several times the frequency of cycling of the main cycling switch.

4. In a control for a surface heating unit or the like, a main cycling switch comprising a pair of contacts, temperature responsive means operable to move one of said contacts in opening direction upon increase in temperature and in closing direction upon decrease in temperature, and means for heating said temperature responsive means upon passage of electrical current through said contacts, whereby said contacts are cyclically opened and closed to control the percentage of "on" time of the circuit controlled thereby, said said main cycling switch including temperature responsive means for adjusting the setting thereof; and a control circuit for said main cycling switch including a heating element arranged to heat said last-mentioned temperature responsive means and a second cycling switch controlling said heating element, the latter switch comprising a pair of contacts in series with said heating element, a temperature responsve element operable to move one of the contacts of said second cycling switch in one direction upon increase in temperature and in the opposite direction upon decrease in temperature, means for heating said temperature responsive element upon passage of current through the last-mentioned contacts, whereby said second cycling switch contacts are cyclically opened and closed to control the average wattage delivered to said heating element, a manually adjusted variable resistor connected in the control circuit to vary the instantaneous wattage imposed on said heating element when said contacts are closed to vary the temperature setting of the control, and a second temperature responsive element operable to control the action of said second cycling switch to vary the percentage of "on" time thereof in response to variation in its temperature.

5. A control as set forth in claim 4 wherein said variable resistor is connected in parallel with said heating element and in series with the contacts of said second cycling switch.

6. In a control for a surface heating unit or the like, the combination of a main cycling switch comprising a pair of contacts, means for cyclically opening and closing said contacts so as to control a circuit by the percentage of time that said circuit is closed, said main cycling switch including temperature responsive means adapted to vary the percentage of "on" time provided by the switch in accordance with the amount of heat imposed thereon, and a control circuit for controlling said main cycling switch comprising a control heating element arranged to heat said temperature responsive means; a second cycling switch comprising a pair of contacts controlling said heating element, a temperature responsive element for opening said second cycling switch contacts upon increase in temperature and closing said last-mentioned contacts upon decrease in temperature, said temperature responsive element being heated during engagement of said last-mentioned contacts, whereby said last-mentioned contacts are cyclically opened and closed, a manually adjusted variable resistor in said control circuit adapted to vary the instantaneous current imposed on said control heating element, thereby to vary the heat imposed on the temperature responsive means of the main cycling switch for a given percentage of "on" time of the second cycling switch, and a second temperature responsive element adapted to adjust the second cycling switch to control the percentage of "on" time thereof.

7. In a control for a surface heating unit or the like, the combination of a main cycling switch comprising a pair of contacts, means for cyclically opening and closing said contacts so as to control a circuit by the percentage of time that said circuit is closed, said main cycling switch including temperature responsive means adapted to vary the percentage of "on" time provided by the switch in accordance with the amount of heat imposed thereon; and a control circuit for controlling said main cycling switch comprising a control heating element arranged to heat said temperature responsive means, a second cycling control comprising a pair of contacts controlling said heating element, a temperature responsive element for opening said last-mentioned contacts upon increase in temperature and closing said last-mentioned contacts upon decrease in temperature, said temperature responsive element being heated during engagement of said contacts, whereby said contacts are cyclically opened and closed, a variable resistor in said control circuit adapted to vary the instantaneous current imposed on said control heating element, thereby to vary the heat imposed on the temperature responsive means of the main cycling switch for a given percentage of "on" time of the second cycling switch, a second temperature responsive element adapted to adjust the second cycling switch to control the percentage of "on" time thereof, and a manually actuated member for operating said variable resistor, said main cycling switch having other means controlled by said manually actuated member to vary the percentage of "on" time, thereby to modify the change in percentage of "on" time otherwise provided by said control heating element.

References Cited in the file of this patent

UNITED STATES PATENTS

| | | |
|---|---|---|
| 2,816,203 | Weeks | Dec. 10, 1957 |
| 2,883,507 | Lewis et al. | Apr. 21, 1959 |
| 2,919,337 | Brosseau et al. | Dec. 29, 1959 |